(12) United States Patent
Yanagisawa

(10) Patent No.: US 9,483,514 B2
(45) Date of Patent: *Nov. 1, 2016

(54) SEARCHING A VERTEX IN A PATH

(71) Applicant: INTERNATIONAL BUSINESS MACHINES CORPORATION, Armonk, NY (US)

(72) Inventor: Hiroki Yanagisawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,139

(22) Filed: Mar. 16, 2015

(65) Prior Publication Data

US 2015/0186438 A1   Jul. 2, 2015

Related U.S. Application Data

(63) Continuation of application No. 13/713,636, filed on Dec. 13, 2012, now Pat. No. 9,026,517.

(51) Int. Cl.
*G06F 17/30* (2006.01)

(52) U.S. Cl.
CPC ... *G06F 17/30324* (2013.01); *G06F 17/30477* (2013.01); *G06F 17/30587* (2013.01)

(58) Field of Classification Search
CPC ............ G06K 9/469; G06F 17/30424; G06F 17/30324; H04L 45/16
USPC ...... 707/716, 769, E17.014, 741, 758; 705/6
See application file for complete search history.

(56) References Cited

U.S. PATENT DOCUMENTS

| | | | |
|---|---|---|---|
| 7,310,335 B1* | 12/2007 | Garcia-Luna-Aceves | H04L 12/185 370/390 |
| 7,953,865 B1* | 5/2011 | Miller | H04L 41/5054 370/254 |
| 7,991,859 B1* | 8/2011 | Miller | H04L 41/0803 370/252 |
| 8,521,724 B2* | 8/2013 | Tretjakov et al. | 707/716 |
| 8,543,944 B2* | 9/2013 | Dwyer | G06T 11/206 715/854 |
| 8,554,464 B2* | 10/2013 | Zetune | 701/400 |
| 8,681,635 B2* | 3/2014 | Nesbitt | H04L 45/00 370/238 |
| 8,880,608 B1* | 11/2014 | Gyongyi | G06F 17/30861 707/769 |
| 2002/0042274 A1* | 4/2002 | Ades | H04L 41/0806 455/445 |
| 2003/0070153 A1* | 4/2003 | Stevens | G06F 17/5077 716/126 |
| 2005/0073962 A1* | 4/2005 | Zabele | H04L 45/00 370/254 |
| 2008/0002573 A1* | 1/2008 | Mosko | H04L 47/2458 370/229 |

(Continued)

FOREIGN PATENT DOCUMENTS

| | | | |
|---|---|---|---|
| JP | 5040899 A | 2/1993 | |
| JP | 5134604 A | 5/1993 | |

(Continued)

*Primary Examiner* — Baoquoc To
(74) *Attorney, Agent, or Firm* — Tutunjian & Bitetto, P.C.; Vazken Alexanian

(57) ABSTRACT

Methods and systems for searching a path for a vertex include iteratively removing from consideration points in a path, until a number of remaining points is below a path size threshold. The iterative removal includes determining, for each of two endpoints in a path, a lower bound for a shortest path distance from each respective endpoint to a target vertex and removing from consideration points closer to each respective endpoint than the respective lower bound to produce a shortened path. The shortened path is searched with a processor to determine whether the vertex is in the shortened path.

11 Claims, 4 Drawing Sheets

(56) References Cited

U.S. PATENT DOCUMENTS

| | | | | |
|---|---|---|---|---|
| 2008/0002574 A1* | 1/2008 | Mosko | H04L 43/08 | 370/229 |
| 2008/0002583 A1* | 1/2008 | Liu | H04L 12/1854 | 370/235 |
| 2008/0002587 A1* | 1/2008 | Liu | H04L 12/1854 | 370/238 |
| 2008/0002635 A1* | 1/2008 | Mosko | H04W 28/14 | 370/338 |
| 2008/0002722 A1* | 1/2008 | Greene | H04W 40/02 | 370/400 |
| 2009/0062136 A1* | 3/2009 | Young | G06F 19/12 | 506/8 |
| 2009/0315890 A1* | 12/2009 | Modani | G06Q 10/10 | 345/440 |
| 2010/0049431 A1* | 2/2010 | Zetune | | 701/200 |
| 2010/0131251 A1* | 5/2010 | Suzuki | | 703/2 |
| 2010/0146092 A1* | 6/2010 | Hu | H04L 67/104 | 709/223 |
| 2010/0305984 A1* | 12/2010 | Ben-Yitschak | G06Q 10/025 | 705/6 |
| 2012/0103678 A1* | 5/2012 | Inaba et al. | | 174/263 |
| 2013/0103678 A1* | 4/2013 | Tretjakov et al. | | 707/723 |
| 2013/0132442 A1* | 5/2013 | Tsatsou | G06F 17/30734 | 707/798 |
| 2013/0173152 A1* | 7/2013 | Schilling | H03M 7/40 | 701/527 |
| 2014/0037149 A1* | 2/2014 | Zetune | | 382/114 |
| 2014/0163872 A1* | 6/2014 | Schilling | G01C 21/3446 | 701/527 |

FOREIGN PATENT DOCUMENTS

| | | |
|---|---|---|
| JP | 7174577 A | 7/1995 |
| JP | 7234993 A | 9/1995 |
| JP | 11064023 A | 3/1999 |
| JP | 2005316818 A | 11/2005 |
| JP | 2006201174 A | 8/2006 |
| JP | 2006293446 A | 10/2006 |
| JP | 2008157698 A | 7/2008 |

* cited by examiner

Receive an edge formed by two vertices
502

Determine whether a first vertex is on the path
504

Determine whether the next vertex on the path is the second vertex
506

FIG. 5

SEARCHING A VERTEX IN A PATH

RELATED APPLICATION INFORMATION

This application is a Continuation application of co-pending U.S. patent application Ser. No. 13/713,636, filed on Dec. 13, 2012, incorporated herein by reference in its entirety.

BACKGROUND

1. Technical Field

The present invention relates processing trajectory data and, in particular, to determining whether a vertex is on a given path.

2. Description of the Related Art

Trajectory data can be collected in very large amounts as complex systems, such as road systems, are mapped and explored. Trajectory data may be represented as a graph, with vertices representing, e.g., intersections and arcs representing, e.g., roads. In such a graph, a path is represented as a sequence of consecutive vertices, and each edge in the path is defined as a pair of such vertices.

Determining whether a given vertex exists within a given path can be very resource intensive. Due to the potentially very large size of paths, even a linear search may take a long time to complete. Another conventional algorithm uses an inverted index, but such solutions have high memory costs. As a result, the conventional techniques for determining whether a vertex exists on a given path are inadequate for situations where rapid determinations or large datasets are used.

SUMMARY

A method for searching a path for a vertex includes iteratively removing from consideration points in a path, until a number of remaining points is below a path size threshold. The iterative removal includes determining, for each of two endpoints in a path, a lower bound for a shortest path distance from each respective endpoint to a target vertex and removing from consideration points closer to each respective endpoint than the respective lower bound to produce a shortened path. The shortened path is searched with a processor to determine whether the vertex is in the shortened path.

A system for searching a path for a vertex includes a bound index configured to provide lower bound information for a shortest path between two vertices. A bound refinement module includes a processor configured to iteratively remove from consideration points in the path until a number of remaining points is below a size threshold by determining, for each of two endpoints in a path, a lower bound for a shortest path distance from each respective endpoint to a target vertex using the bound index and removing from consideration points closer to each respective endpoint than the respective lower bound to produce a shortened path. A search module is configured to search points on the shortened path for a vertex.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a block/flow diagram of a method for determining whether an edge exists in a path according to the present principles.

DETAILED DESCRIPTION OF PREFERRED EMBODIMENTS

The present principles determine whether a given vertex exists on a given path in a graph by determining upper- and lower-limits for the vertex's position along the path. If the upper- and lower-limits are found to exclude every vertex on the path, then the present principles determine that the vertex does not exist on the path. If not, the present principles repeat the determination by calculating upper- and lower-limits on a path defined by the previous upper- and lower-limit vertices. This process repeats until either until all vertices are excluded or until the length of the path falls below a threshold value. At that point, a linear search is conducted to check the remaining vertices.

Figure 1:
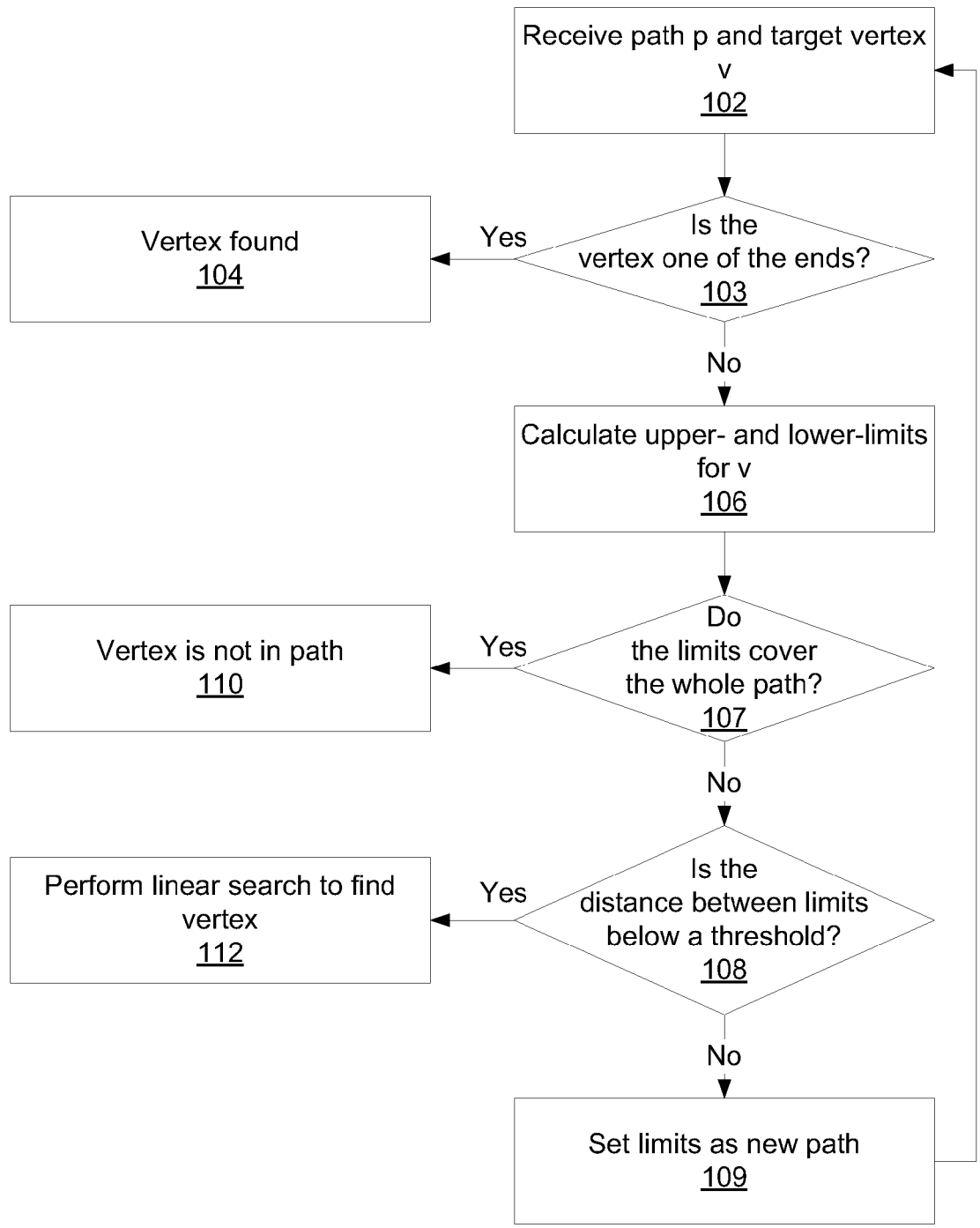
FIG. 1 is a block/flow diagram of a method for determining whether a vertex exists in a path according to the present principles.

Referring now to the drawings in which like numerals represent the same or similar elements and initially to FIG. 1, a method for determining whether a vertex exists on a path is shown. Block 102 receives the path p of length k and a vertex v. The path is defined as a set of vertices $p=\langle v_1, \ldots, v_k \rangle$ on a graph, where each vertex $v_i$ ($i=\{1, \ldots, k\}$) is a vertex ID and each consecutive pair of vertices $(v_i, v_{i+1})$ is an edge on the graph. Block 103 determines whether the vertex is one of the ends of the path (i.e., whether $v=v_i$ or $v=v_k$). If so, block 104 outputs an indication that the vertex exists within the path and the loop ends. For the purposes of explanation it should be understood that the path p is considered to have a "beginning" at $v_1$ and an "end" at $v_k$. This designation is arbitrary and the reverse should be understood as being equivalent. It is used herein to orient the path, such that the "lower-limit" describes a distance from the beginning of the path and the "upper-limit" describes a distance from the end of the path.

If not, block 106 calculates upper- and lower-limits for the position of the vertex v in the path p. The upper- and lower-limits may be calculated according to any appropriate method, and greater detail will be given to these calculations below. To understand the present principles, it suffices that the calculations provide concrete limits for the position of any given vertex within the path, but that the presence of a limit need not indicate that the vertex definitely exists within the path. Calculating both an upper and lower-limit for the position of the vertex on the path gives a possible range of locations for the vertex. The limits may be represented as a lower-bound for a distance from an endpoint of the path p to the vertex v. It should be understood that a "lower-bound" of the shortest path distance is used for each of the endpoints of the path, establishing both the upper- and lower-limits for the position of the vertex on the path. Measured from each end of the path p, this establishes a range of positions that the vertex v cannot occupy.

Processing continues to block 107, which determines whether the bounds cover the entire path. In other words, block 107 determines whether the lower limit extends beyond the upper limit for the vertex's position on the path. For example, in a path having nine positions, if the lower limit is position 5 and the upper limit is position 4, then there is no possible position for the vertex in the path. If this is the case, block 110 outputs that the vertex is not in the path. If not, processing continues to block 108, which determines the length of the path between the limits. If the length of the path between the limits is below a threshold, block 112 performs a linear search to determine whether the vertex is in the path. By only performing such a search when the number of vertices to be checked is small, the performance penalty of the search is minimized. The threshold size depends on the speed of the lower bound calculations and the linear search, but an exemplary choice of threshold would be about 10.

If the distance between the limits is still larger than the threshold, the limits are used as the endpoints of a new path and the new path is used as the input to the process at block 102. The process repeats until either the vertex is located or it is determined that the vertex cannot exist in the path. It should be understood that the process may be repeated iteratively or recursively to equivalent effect.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
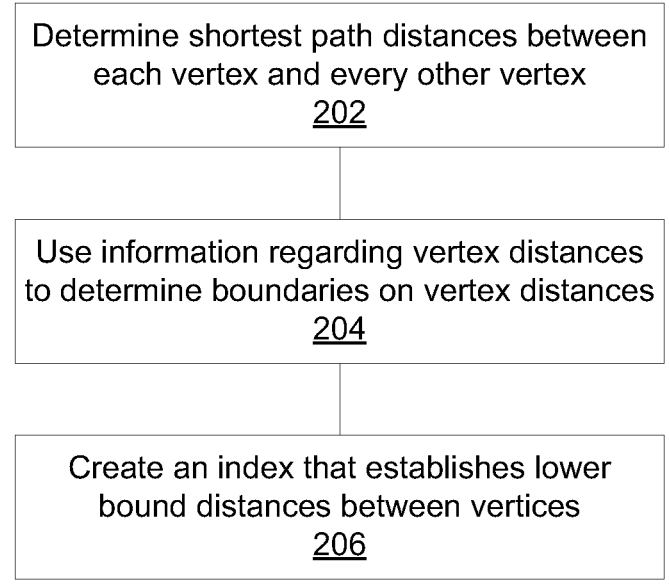
FIG. 2 is a block/flow diagram of a method for creating an index that provides bounding information on the distance of a vertex from a path endpoint according to the present principles.

Referring now to FIG. 2, more detail is provided on how to produce an index of lower bounds is shown. Any appropriate method for calculating such limits could be used in conjunction with the present principles—the following is just one exemplary embodiment. A lower bound is used because creating a full table of shortest path distances is often prohibitively expensive in terms of storage cost—if there are 1,000 vertices in the graph, then such an index would have about 1,000,000 entries.

However, it is possible to exploit dependencies between the distances if some loss of precision can be tolerated. This allows the table to be reduced in size by orders of magnitude. Consider a case where three vertices, u, v, and w are in a graph, where d(u,v), d(v,w), and d(u,w) are the shortest path distances between u and v, v and w, and u and w respectively. Block 202 determines such shortest path distances for each vertex to every other vertex.

Because the present principles do not need the precise distance, these distances are not stored in the index. Instead, block 204 uses dependencies between the vertices to capture lower-bound information. Using the above example distances, one exemplary calculation for these values would be to express d(v,w) in terms of d(u, v) and d(u,w). The triangle inequality dictates that d(u,v)+d(u,w), such that d(u,w)−d(u, v) is a lower bound for d(v,w). In this example, only two distances are stored for the three bounds—additional dependencies can be found in larger numbers of vertices or using different calculation methods. Block 206 creates an index that captures these dependencies, such that the index can be used as a black box to find limits on the position of a vertex v. For example, the index may store exact shortest path distances for a small number of pairs of vertices, while the lower bounds of the other pairs of vertices are calculated with some inequality relation (e.g., the triangle inequality) between the exact shortest path distances.

In one concrete example, the present principles were applied to a road map of California having 161 million vertices. Paths were generated by selecting two random vertices in the graph and a shortest path was calculated between the points. One hundred thousand such paths were generated and one hundred vertices were selected to test the paths. Whereas a linear search to determine whether a given vertex existed in a given path took about 21.8 seconds, embodiments of the present principles were able to locate such vertices in about 2.5 seconds. In these simulations, the index size was only a few times larger than the graph itself. Compared to a full shortest-distance table, which would have a number of entries equal to the number of vertices squared, the memory savings are very large.

Figure 3:
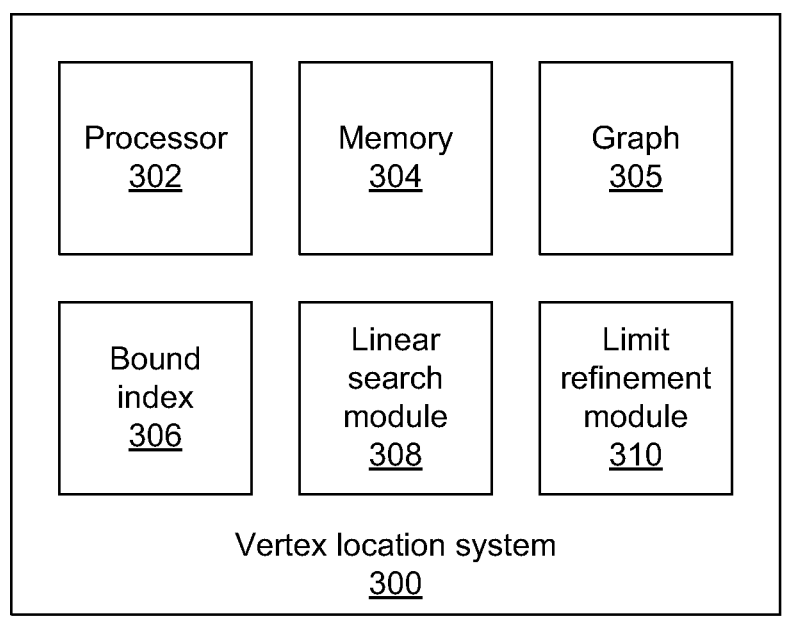
FIG. 3 is a diagram of a vertex location system according to the present principles.

Referring now to FIG. 3, a system 300 for determining whether a vertex is in a path is shown. The system 300 includes a processor 302 and a memory 304 that stores a graph 305 and an index of lower bounds 306. As described above, the bound index 306 can be created according to any appropriate method for representing shortest path distances between vertices in the graph 305 as lower bounds on such distances.

Limit refinement module 310 is configured to consult bound index 306 to determine limits on the position of a specific vertex within a given path. As described above, this is an iterative or recursive process. On each iteration, the limit refinement module 310 uses processor 302 to determine whether the vertex has been found or shown not to exist in the path. If it cannot do so, the limit refinement module 310 begins a new iteration using the upper- and lower-limits provided by the bound index 306 to define a new path. When the length of the path being processed by limit refinement module 310 drops below a predefined threshold, a linear search module 308 uses processor 302 to check every vertex in the remaining path until the specific vertex is either found or the path is exhausted. If either the linear search module 308 or the limit refinement module 310 locates the vertex or shows it not to exist on the path, the system 300 may output this information as binary yes/no, stating simply whether the vertex exists on the path.

Figure 4:
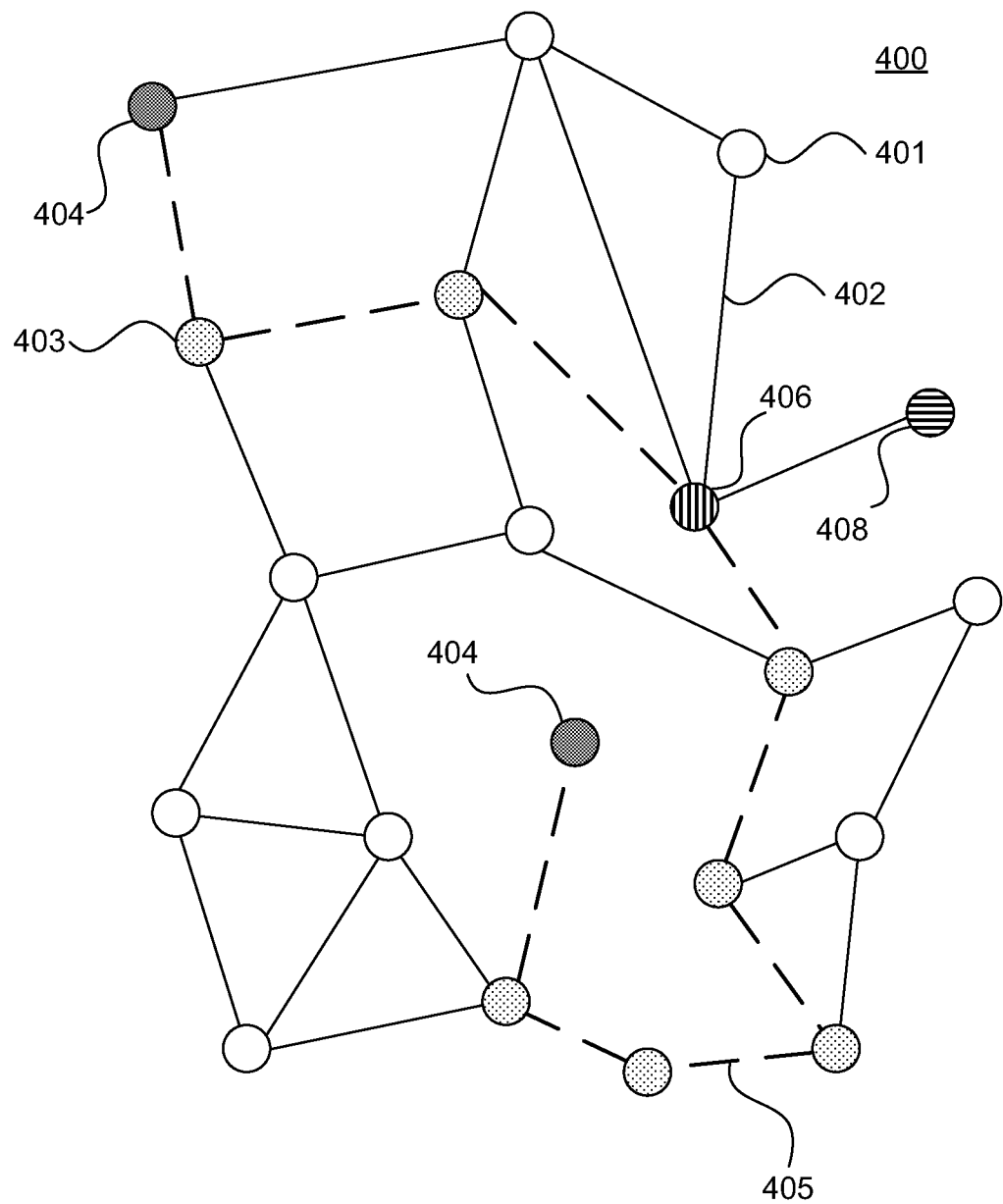
FIG. 4 is an exemplary graph having a path and vertices to be searched according to the present principles.

Referring now to FIG. 4, an exemplary graph 400 is shown. The graph 400 is formed from vertices 401, connected by edges 402. The graph includes a path formed from vertices 403 and having endpoint vertices 404, with path edges 405 connecting the path vertices. It should be noted that this graph is only a small example—real-world applications may include graphs having many millions of vertices.

Two vertices, 406 and 408, are checked to determine whether they exist within the graph 400. While a visual inspection of this small-scale example provides an immediate answer, real-world paths may themselves be very large. In the present example, with a path having ten vertices, a linear search of the path would take up to ten steps to definitively determine whether a vertex is on the path.

According to the present principles, upper- and lower-limits are found for the distance from each endpoint 404 to the target vertex 406. The limits establish portions of the path that the vertex 406 cannot be in, substantially reducing the range of possibilities in a single step. If there are still possible vertices that did not fall within the limits, those remaining vertices are treated as a new path and new limits are found for the new path endpoints. Eventually either one of the endpoints will be the vertex in question, the vertices in the path will be entirely covered by the limits, or the remaining vertices will be few enough in number that a linear search becomes practical.

Referring now to FIG. 5, an extension of the above vertex-searching is shown that determines whether a given edge exists on a path. Block 502 receives information regarding the edge to be searched. As described above, the edge may be a set of two consecutive vertices, $v_1$ and $v_2$. Block 504 determines whether $v_1$ exists on the path according to the present principles. If so, block 506 then determines whether $v_2$ is the next vertex on the path. Because the path is simply a list of vertices, this is a simple read operation. If $v_2$ is the next vertex, then the edge does exist on the path.

Having described preferred embodiments of a system and method for searching a vertex in a path (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for searching a path for a vertex, comprising:
   iteratively removing from consideration points in a path, until a number of remaining points is below a path size threshold, by:
   determining, for each of two endpoints in a path, a lower bound for a shortest path distance from each respective endpoint to a target vertex by calculating a relationship between known shortest path distances; and removing from consideration points closer to each respective endpoint than the respective lower bound to produce a shortened path; and searching the shortened path with a processor to determine whether the vertex is in the shortened path.

2. The method of claim 1, further comprising determining whether one of the two endpoints of the path is the vertex.

3. The method of claim 1, wherein said step of determining a lower bound comprises looking up the lower bound in a table.

4. The method of claim 1, wherein determining whether the lower bounds cover all points in the path comprises determining whether a lower bound associated with one endpoint is farther along the path than a lower bound associated with the other endpoint.

5. The method of claim 1, wherein the search of the uncovered points is a linear search.

6. A non-transitory computer readable storage medium comprising a computer readable program for searching a path for a vertex, wherein the computer readable program when executed on a computer causes the computer to perform the steps of:

iteratively removing from consideration points in a path, until a number of remaining points is below a path size threshold, by:

determining, for each of two endpoints in a path, a lower bound for a shortest path distance from each respective endpoint to a target vertex by calculating a relationship between known shortest path distances; and removing from consideration points closer to the respective endpoints than the respective endpoints to produce a shortened path; and searching the shortened path with a processor to determine whether the vertex is in the shortened path.

7. A system for searching a path for a vertex, comprising:

a bound index configured to provide lower bound information for a shortest path between two vertices;

a bound refinement module comprising a hardware processor configured to iteratively remove from consideration points in the path until a number of remaining points is below a size threshold, by determining, for each of two endpoints in a path, a lower bound for a shortest path distance from each respective endpoint to a target vertex, said lower bound being determined by calculating a relationship between known shortest path distances, and removing from consideration points closer to each respective endpoint than the respective lower bound to produce a shortened path; and a search module configured to search points on the shortened path for a vertex.

8. The system of claim 7, wherein the bound refinement module is further configured to determine whether one of the two endpoints of the path is the vertex.

9. The system of claim 7, wherein the bound index is a lookup table that includes shortest path lower bound values for fewer than all a total number of vertices.

10. The system of claim 7, wherein the bound refinement module is further configured to determine whether a lower bound associated with one endpoint is farther along the path than a lower bound associated with the other endpoint to determine whether the lower bounds cover all points in the path.

11. The system of claim 7, wherein the search module is configured to perform a linear search.

* * * * *